United States Patent [19]

Lewis

[11] Patent Number: 4,699,337
[45] Date of Patent: Oct. 13, 1987

[54] CARGO HANDLING SYSTEM FOR AIRCRAFT

[75] Inventor: William W. Lewis, Newtownabbey, Northern Ireland

[73] Assignee: Short Brothers plc, Belfast, Northern Ireland

[21] Appl. No.: 843,115

[22] Filed: Mar. 24, 1986

[30] Foreign Application Priority Data

Apr. 4, 1985 [GB] United Kingdom ............... 8508840

[51] Int. Cl.⁴ .............................................. B64C 1/20
[52] U.S. Cl. ................................ 244/137.1; 414/343; 414/500; 414/400
[58] Field of Search ........... 244/137 R, 137 P, 137 L; 414/343, 398, 400, 500, 346

[56] References Cited

U.S. PATENT DOCUMENTS

| | | | |
|---|---|---|---|
| 2,846,092 | 8/1958 | Garnett | 214/84 |
| 4,000,870 | 1/1977 | Davies | 244/118 |
| 4,344,726 | 8/1982 | Naffa | 410/79 |
| 4,408,739 | 10/1983 | Buchsel | 414/347 |
| 4,412,774 | 11/1983 | Legrand et al. | 244/54 |
| 4,426,051 | 1/1984 | Banks et al. | 244/137 L |

FOREIGN PATENT DOCUMENTS

| | | | |
|---|---|---|---|
| 0104945 | 4/1984 | European Pat. Off. | 244/137 R |
| 2269480 | 11/1975 | France . | |
| 874279 | 8/1961 | United Kingdom | 244/137 R |

Primary Examiner—Joseph F. Peters, Jr.
Assistant Examiner—Rodney Corl
Attorney, Agent, or Firm—Kenyon & Kenyon

[57] ABSTRACT

A variety (FIG. 4) of aero engines (30) can be rear-loaded into an aircraft cargo bay (10) with precision and safety and minimal clearance with the sides of the bay (10) by installing a roller conveyor trackway (20,22) along two seat rails (12,14) running the length of the bay (10) and its bottom-hinged rear-loading ramp (15). A ground trailer (33) carrying the engine (30) on its yoke (31) is coupled to a dolly (37) running on the trackway (20,22) and the yoke (31) transferred from rails (32) on the trailer (33) to rails (36) on the dolly (37). The dolly (37) is then winched (27) along the trackway into the bay (10) where it is made secure for flight of the aircraft. The dolly (37) can be dismantled when not in use and the trackway (when installed) is useful when pallets are to be transported.

8 Claims, 9 Drawing Figures

CARGO HANDLING SYSTEM FOR AIRCRAFT

BACKGROUND OF THE INVENTION

1. Field of the Invention

For loading cargo into aircraft which have a cargo bay served by a rear loading aperture with a loading ramp hinged at its lower edge, it has been proposed to move cargo in and out of the bay on surface vehicles such as trolleys. In the context of small cargo aircraft the proposal has the severe disadvantages that a trolley can take up much of the available cross-section of the bay, so unduly limiting the size of cargo item which can be carried, and the weight of the trolley limits unduly the weight of cargo items which can be carried.

2. Related Art

In a previous proposal for transport of aero engines as cargo, the cargo bay was to be equipped with a pair of fixed rails high enough off the floor of the cargo bay to accommodate a range of engines carried in their normal supporting yoke structures. Severe problems with this proposal were the weight of the raised rail structure and the obvious restriction it imposed on the carriage of personnel or other cargo such as pallets.

SUMMARY OF THE INVENTION

The present invention aims to ameliorate these disadvantages. It also aims to provide a system adapted for use in aircraft constructed for alternate use as passenger aircraft and freight-carrying aircraft.

According to the present invention there is provided a cargo handling system for an aircraft with a fuselage having a longitudinally-extending cargo bay with a loading aperture at one end thereof and a load bearing structure beneath the floor of the cargo bay, the system comprising: at least two conveyor tracks adapted to run at floor-level lengthwise into the cargo bay from the loading aperture; a plurality of releasable fasteners by which the tracks may be fastened at spaced parallel fastening points to the floor of the cargo bay to provide a cargo-handling railway; an undercarriage to support an item of cargo and to run on the conveyor tracks; and a ground vehicle including support rails for carrying the cargo item and adapted to be moved on the ground relative to the aircraft in order that the support rails of the vehicle may be aligned with support rails provided on the undercarriage for transfer of the cargo item between the vehicle and the undercarriage in the cargo bay.

The floor level railway and undercarriage weighs less than wheeled vehicles for cargo items. The full cross-section of the cargo bay is available to accommodate the cargo items and the section is not obstructed by the conveyor tracks when the bay is empty.

Where the cargo bay has in its floor a plurality of longitudinally-extending seat rails these can be used as fastening points for the conveyor tracks having, as they do, a substantial sub-floor load bearing structure. Preferably, the conveyor tracks can be released rapidly from the seat rails and stored elsewhere in the cargo bay to free the bay for use carrying passengers. The tracks are useful when other cargo such as pallets is to be loaded into and unloaded from the cargo bay.

DETAILED DESCRIPTION OF THE PREFERRED EMBODIMENT

Figure 1:
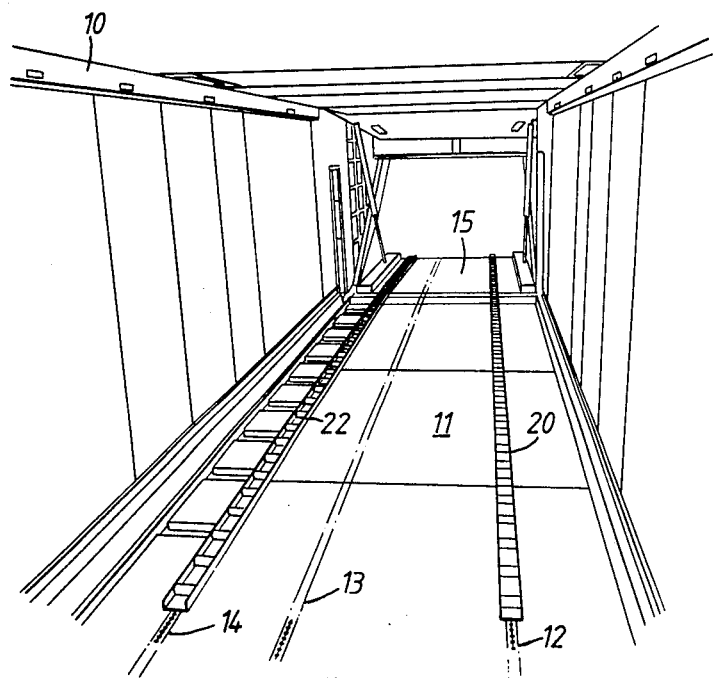
FIG. 1 shows in perspective the interior of a cargo bay of an aircraft.
Figure 5:
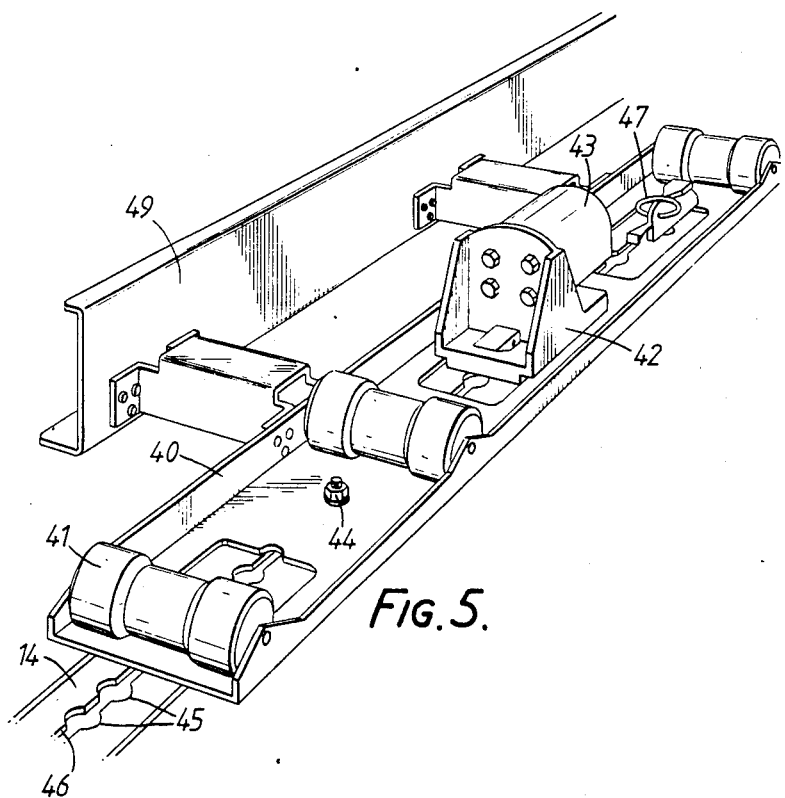
FIG. 5 is a perspective view of an end portion of a roller conveyor track.

In FIG. 1, the bay 10 has a floor 11 in which are three like seat rail channels 12,13,14 (which can also be seen in FIG. 5). The channels are extended along the full length of a rear loading ramp 15 of the bay. To the channels 12 and 14 are respectively secured roller conveyor track lengths 20 and 22, as explained below with reference to FIG. 5.

Figure 2A:
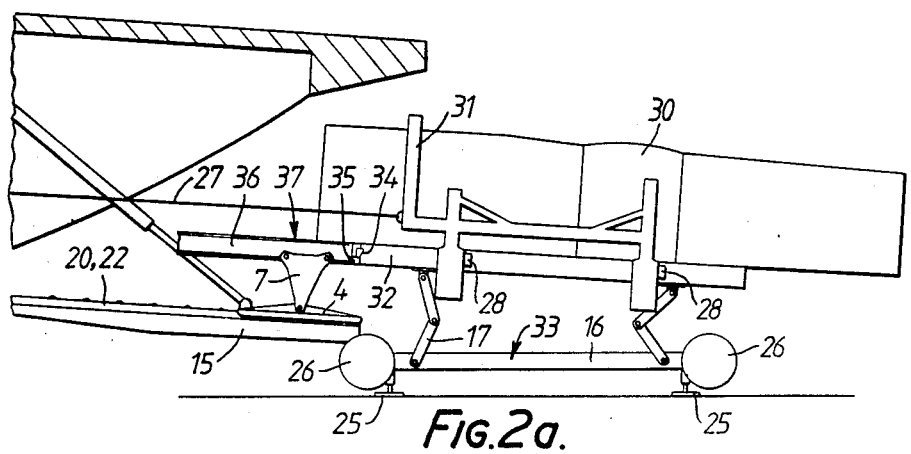
FIGS. 2a to d are side views of an aero engine in transfer between a ground vehicle and the cargo bay.

FIG. 2a shows an aero engine 30 cradled in a support structure 31 which runs on twin rails 32 of a ground-positioning wheeled trailer 33. The rails are carried above the chassis 16 of the trailer 33 by articulated links 17 which can be adjusted to change the angle of the rails 32 relative to the ground. A fastener 34 on the front end of each rail 32 engages with a corresponding fastener 35 on the rear end of each of a pair of rails 36 of an undercarriage dolly 37 which runs on the rails 20 and 22 in the bay 10.

In use, the dolly 37 and trailer 33 are aligned with each other. The dolly 37 is locked to the rails 20 and 22, and ground support pads 25 are lowered so as to raise the ground wheels 26 of the trailer 33 off the ground. The fasteners 34 and 35 are engaged so that the cargo item can be transferred between the conveyor rails 32 and corresponding rails 36 of the dolly 37. The angles of the ramp 15 and the rails 32 are chosen to facilitate passage of the cargo item into and out of the bay 10.

A winch cable 27 is attached to the support yoke structure 31 and placed in tension. The locking of the dolly 37 to the rails 20 and 22 is released. Locks 28 holding the support structure 31 to the trailer 33 are released, and the structure 31 is winched forward onto the rails 36 of the dolly 37. Stops on the front ends of the rails 36 prevent excessive forward movement of the structure 31.

Once the whole of the structure 31 is on the dolly 37, it is locked to the dolly 37 and the fasteners 34,35 coupling the dolly rails to the trailer rails 32 are released, so the trailer 33 can be put back on its wheels 26 and moved away.

Figure 2B:
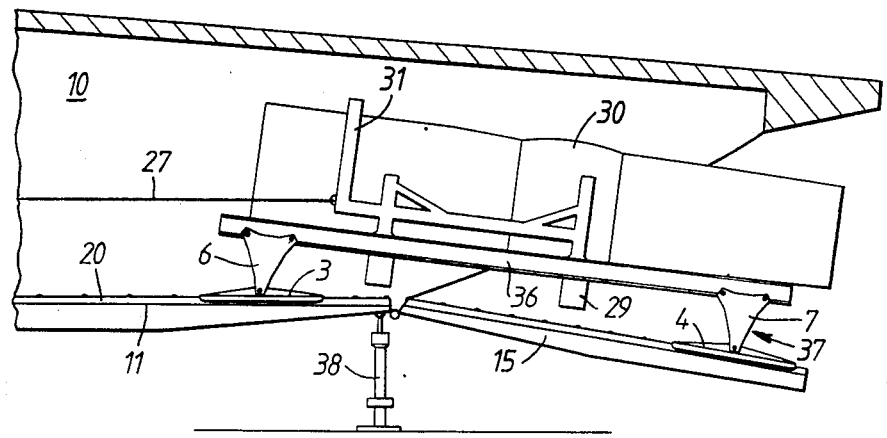
Figure 2C:
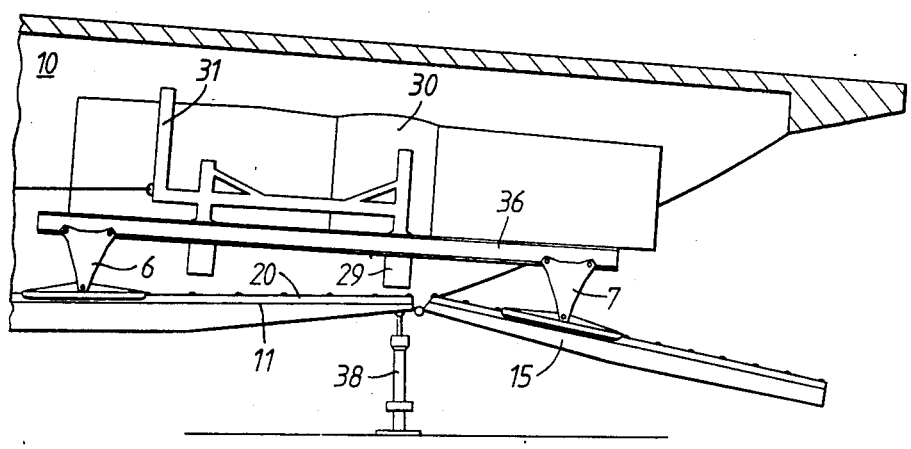

As shown in FIGS. 2b and c, there is a steady jack 38 to support the rear end of the bay 10 above the ground.

The winch cable 27 is then pulled, to draw the dolly 37 up the ramp 15. The legs 6 and 7 of the dolly 37 hold its rails 36 high enough above the floor 11 and ramp 15 to avoid any contact between low points 29 of the support structure 31 or cargo item 30 and the floor 11 or ramp 15.

Figure 2D:
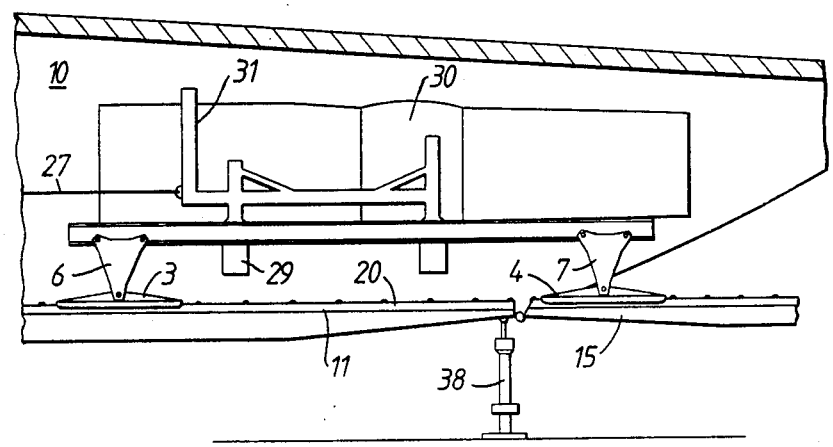

With the major part of the length of the dolly 37 within the cargo bay 10 but with its rear legs 7 still on the ramp 15, the ramp is raised to the position shown in FIG. 2d, so that the foot 4 of the rear leg 7 may run smoothly from the ramp 15 to the floor 11.

Figure 2E:
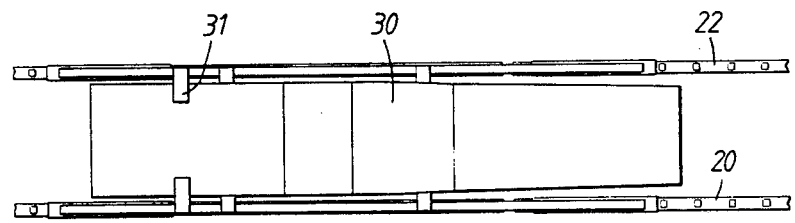
FIG. 2e is a view from above of the aero engine and support rails as shown in FIG. 2d.

FIG. 2e shows how the dolly 37 and its cargo lie within the width of the rails 20,22. With other cargoes this may not be the case.

It is to be noted that the ability to tilt the bottom-hinged ramp 15 to different angles relative to the floor 11 of the bay 10 increases the possibilities of moving large cargo items through the loading aperture of the cargo bay 10, to an extent not possible with fixed raised rails running the length of the bay 10.

Figure 3:
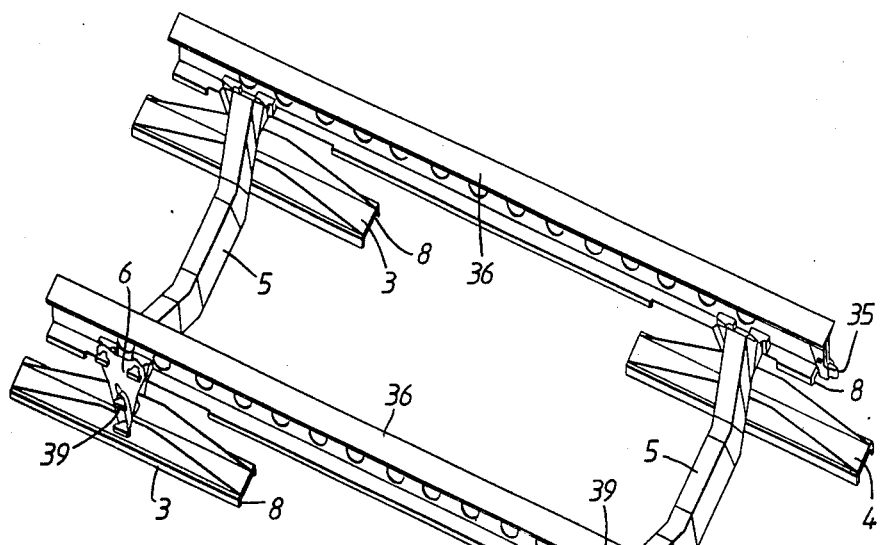
FIG. 3 is a view of an undercarriage.
Figure 4:
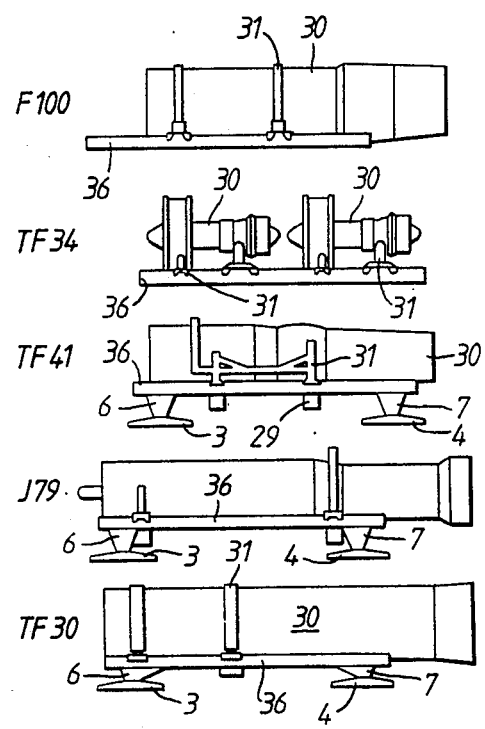
FIG. 4 is a Table showing how the undercarriage is used to carry five different aero engines.

FIG. 3 shows the components of the dolly and how they fit together. In a case in which a cargo item does not project downwardly below its support points, the dolly need comprise no more than the rails 36 fastened to the cargo items at these support points, the rails then running directly on the conveyor tracks 20 and 22. FIG. 4 shows by way of example that some aero engines, namely F100 and TF34 engines, can be handled in this way.

In a case in which there is downward projection below the support points of a cargo item, the rails 36 are carried on legs 6 and 7 which can be configured in a "high" or "low" disposition. Pivotably mounted at the base of each leg is a foot 3,4 which is a short rail length each of which feet running on one of the tracks 20 and 22. A cross-brace 5 between each pair of legs 6 and 7 confers stability on the dolly. Examples of engines which can be carried with the legs 6 and 7 in their "high" disposition are shown in FIG. 4 to be TF41 and J79 engines. TF30 engines are carried with the legs 6 and 7 configured in their "low" disposition, i.e. on their side relative to the "high" configuration. Quick-release fasteners 39 between the components of the dolly are used, so that it can be set up quickly in whichever one of the different configurations is required. Rails 36 of an alternative length could of course be used, as dictated by the length of the cargo.

The dolly 37 is a lightweight pack-away structure which can be dismantled and packed away, and thus can be carried within the aircraft when not in use, without any intolerable penalty in added weight or occupation of space.

FIG. 5 shows how the conveyor tracks 20 and 22 are constructed from channel-section members 40 (usually several such members arranged end-to-end make up each track) carrying rail-bearing rollers 41, generally at regular intervals. At any desired position along each conveyor track 20 and 22 is positioned a load-stop buffer unit 42 with a block of soft rubber 43. The channel members are secured to the seat rails 12 and 14 by studs 44. Tie-down rings 47 have mushroom heads which drop through spaced openings 45 into the seat rail channel to rest behind the longitudinal slot 46 of the seat rail. This fixing method is in itself known.

In the particular case of FIG. 5, the channel member 40 is provided with a side guidance rail 49 which is useful to provide lateral support to pallets carried on the tracks 20 and 22. The rail 49 is superfluous during use of the dolly 37, however, because the rails 36 and rail length feet 3 and 4 have depending wall portions 8 which overlap both sides of the tracks 20 and 22 on which they run, this overlap affording a full measure of lateral support, and guidance of the dolly along the tracks 20 and 22. While the cargo item and dolly are hosed in the bay 10 they are securely lashed to the floor and/or walls of the bay.

A track on the centre channel 13 of the cargo bay 10 may be provided when containers or pallets are to be carried in the bay, especially LD3 containers, to provide extra support.

With the system of the present invention, large cargo items can be moved with precision, and therefore with small lateral clearances, into and out of cargo bays of aircraft. Judicious adjustment of angle of loading ramp, during loading and unloading, is used to manoeuvre large items through the loading aperture. As the cargo items are at all times fully supported against transverse movement, the operation is relatively safe. These benefits are achieved despite the relatively small bulk and obstruction which the system introduces.

I claim:

1. A cargo handling system for an aircraft with a fuselage having a longitudinally-extending cargo bay with a loading aperture at one end thereof and a load bearing structure beneath the floor of the cargo bay, a cargo item to be handled being disposed upon a support structure, the system comprising at least two conveyor tracks adapted to extend at floor-level lengthwise into the cargo bay from the loading aperture and fastened to the floor of the cargo bay to provide a cargo-handling railway; an undercarriage disposed within the cargo bay and adapted to carry with the cargo the support structure and a cargo item disposed thereon independently of other support therefor, the undercarriage having support rails adapted to run on the conveyor tracks; and a ground vehicle including support rails for movably carrying the support structure and the cargo item disposed thereon, the ground vehicle being adapted to be moved on the ground relative to the aircraft to enable the support rails of the ground vehicle to be aligned with the support rails of the undercarriage for transfer of the cargo item between the ground vehicle and the undercarriage in the cargo bay.

2. A system as claimed in claim 1 wherein the conveyor tracks are roller conveyors.

3. A system as claimed in claim 1 for an aircraft which has a loading ramp hinged to the floor of the cargo bay along its lower edge, the tracks of the system adapted to carry the cargo-handling railway to the free end of the ramp.

4. A system as claimed in claim 3 wherein the support rails of the ground vehicle are carried on structure which can be adjusted to change the angle of the support rails relative to the ground for alignment with the angle of the support rails of the undercarriage relative to the ground.

5. A system as claimed in claim 1 wherein the support rails of the undercarriage comprise a pair of rails each of which has a downward-facing surface to run on the cargo-handling railway and an upward-facing surface to carry the support structure and a cargo item thereon.

6. A system as claimed in claim 5 wherein the undercarriage rails have depending wall portions which overlap the sides of the conveyor tracks on which the rails run.

7. A system as claimed in claim 5 wherein the undercarriage comprises a plurality of legs to depend from the undercarriage support rails, each of the legs having a foot pivotally mounted to it, each foot carrying a length of the downward-facing surface to run on the cargo-handling railway.

8. A system as claimed in claim 7 wherein the legs have two alternative dispositions to provide at least a high disposition with a relatively large distance between the feet and the support rails of the undercarriage and a low disposition of lesser said distance.

* * * * *

UNITED STATES PATENT AND TRADEMARK OFFICE
CERTIFICATE OF CORRECTION

PATENT NO. : 4,699,337
DATED : October 13, 1987
INVENTOR(S) : LEWIS

It is certified that error appears in the above-identified patent and that said Letters Patent is hereby corrected as shown below:

Column 3, line 65, delete "hosed" and insert --housed--.

Signed and Sealed this

Tenth Day of May, 1988

Attest:

DONALD J. QUIGG

Attesting Officer

Commissioner of Patents and Trademarks